US011956610B2

(12) United States Patent
Guo et al.

(10) Patent No.: US 11,956,610 B2
(45) Date of Patent: Apr. 9, 2024

(54) CONDUCTIVE FILM FOR A SOUND GENERATION DEVICE AND THE SOUND GENERATION DEVICE

(71) Applicant: GOERTEK INC., Shandong (CN)

(72) Inventors: Xiaodong Guo, Shandong (CN); Yanyan Hou, Shandong (CN)

(73) Assignee: GOERTEK INC., Weifang (CN)

( * ) Notice: Subject to any disclaimer, the term of this patent is extended or adjusted under 35 U.S.C. 154(b) by 196 days.

(21) Appl. No.: 17/754,278

(22) PCT Filed: Sep. 28, 2020

(86) PCT No.: PCT/CN2020/118488
§ 371 (c)(1),
(2) Date: Mar. 29, 2022

(87) PCT Pub. No.: WO2021/058006
PCT Pub. Date: Apr. 1, 2021

(65) Prior Publication Data

US 2022/0386031 A1 Dec. 1, 2022

(30) Foreign Application Priority Data

Sep. 29, 2019 (CN) ........................ 201910931223.2

(51) Int. Cl.
*H04R 7/04* (2006.01)
*H04R 9/02* (2006.01)

(52) U.S. Cl.
CPC ................. *H04R 7/04* (2013.01); *H04R 9/02* (2013.01); *H04R 2207/021* (2013.01)

(58) Field of Classification Search
CPC ....... H04R 7/04; H04R 9/02; H04R 2207/021
(Continued)

(56) References Cited

U.S. PATENT DOCUMENTS

| | | | | |
|---|---|---|---|---|
| 4,465,905 A * | 8/1984 | Nation | ..................... | H04R 1/24 381/386 |
| 6,269,167 B1 * | 7/2001 | Mango, III | .............. | H04R 1/06 381/409 |

(Continued)

FOREIGN PATENT DOCUMENTS

| | | |
|---|---|---|
| CN | 103024638 A | 4/2013 |
| CN | 205793288 U | 12/2016 |

(Continued)

OTHER PUBLICATIONS

International Search Report from International Application No. PCT/CN2020/118488 dated Dec. 30, 2020.

*Primary Examiner* — Suhan Ni
(74) *Attorney, Agent, or Firm* — Shih IP Law Group, PLLC

(57) ABSTRACT

The present disclosure discloses a conductive film for a sound generation device and the sound generation device, the conductive film comprises a conductive layer and base material layers provided at two sides thereof, the conductive layer comprises a first conductive layer on an inner side portion, a second conductive layer on a deformation portion and a third conductive layer on an outer side portion, two ends of the second conductive layer are respectively electrically connected to the first and third conductive layers, the first, second and third conductive layers are connected to form at least one conductive path, each of the first and third conductive layers is made of a metal sheet, Young's modulus of the second conductive layer is smaller than the metal sheet. The conductive film has conductivity, it can be used as a sound generation diaphragm and a supporting diaphragm.

17 Claims, 7 Drawing Sheets

(58) Field of Classification Search
USPC .................................................. 381/398, 404
See application file for complete search history.

(56) References Cited

U.S. PATENT DOCUMENTS

| | | | | |
|---|---|---|---|---|
| 2002/0094106 | A1* | 7/2002 | Shingu ..................... | H04R 9/06 381/399 |
| 2003/0202676 | A1* | 10/2003 | Ohara .................... | H04R 9/043 381/399 |
| 2006/0251285 | A1* | 11/2006 | Chan ...................... | H04R 9/043 381/404 |

FOREIGN PATENT DOCUMENTS

| | | | |
|---|---|---|---|
| CN | 207053756 | U | 2/2018 |
| CN | 107809705 | A | 3/2018 |
| CN | 207427453 | U | 5/2018 |
| CN | 209314091 | U | 8/2019 |
| CN | 110620976 | A | 12/2019 |
| CN | 110691306 | A | 1/2020 |
| CN | 110691307 | A | 1/2020 |
| CN | 110691308 | A | 1/2020 |
| CN | 110708644 | A | 1/2020 |
| CN | 110784810 | A | 2/2020 |
| KR | 20110111191 | A | 10/2011 |
| KR | 20120007364 | A | 1/2012 |

* cited by examiner

CONDUCTIVE FILM FOR A SOUND GENERATION DEVICE AND THE SOUND GENERATION DEVICE

TECHNICAL FIELD

The present disclosure relates to a technical field of electro-acoustic conversion, and more particularly, the present disclosure relates to a conductive film for a sound generation device and the sound generation device.

BACKGROUND ART

A sound generation device generally comprises a diaphragm and a voice coil provided at a side of the diaphragm, and further comprises an electrical connector for electrically connecting an internal circuit and an external circuit of the sound generation device. Wherein, the voice coil comprises two voice coil lead wires, and the two voice coil lead wires are electrically connected to two pads of the electrical connector by spot welding, etc. In the meanwhile, the electrical connector is electrically connected to the external circuit to control an electrical signal in the voice coil through an electrical signal of an end product.

Generally speaking, the lead wires of the voice coil are required to extend a distance of a certain length, such that the electrical connection with the electrical connector can be realized after the lead wires are suspended. A structure of the suspended lead wires can achieve higher sensitivity, however, due to a limitation of the suspended lead wires, amplitude cannot be too large, a risk of wire disconnection is relatively higher, and a low-frequency performance is not significant, so that it cannot provide a better user auditory experience.

In recent years, many researchers begun to research and develop a diaphragm having conductive function, which causes the conductive film widely used in the sound generation device. Currently, the conductive film is mainly made by electrophorese of conductors, electroplating conductors, injection-molding conductors, adding conductive coatings, adding conductive ink layers and laser etching in the diaphragm. However, the above-described methods have defects of difficult for technical realization, low mass production, high cost, low reliability and low acoustic performance in varying degrees.

SUMMARY

An object of the present disclosure is to provide a new technical solution for a conductive film for a sound generation device and the sound generation device.

According to a first aspect of the present disclosure, there is provided a conductive film for a sound generation device, wherein the conductive film comprises a conductive layer and base material layers provided at two sides of the conductive layer, wherein the conductive film comprises an inner side portion at an inner side of the conductive film, a curve-shaped deformation portion provided outside the inner side portion and an outer side portion provided outside the deformation portion.

The conductive layer comprises a first conductive layer provided on the inner side portion, a second conductive layer provided on the deformation portion and a third conductive layer provided on the outer side portion, two ends of the second conductive layer are respectively electrically connected to the first conductive layer and the third conductive layer, and the first conductive layer, the second conductive layer and the third conductive layer are connected to form at least one conductive path.

Each of the first conductive layer and the third conductive layer is made of a metal sheet, and Young's modulus of the second conductive layer is smaller than Young's modulus of the metal sheet.

Preferably, the two ends of the second conductive layer extend to be disposed on the first conductive layer and the third conductive layer, respectively.

Preferably, the second conductive layer is a conductive layer formed by coating or printing.

Preferably, the second conductive layer is a conductive adhesive layer.

Preferably, the conductive adhesive layer is a conductive silver adhesive.

Preferably, the second conductive layer is a conductive ink layer.

Preferably, each of the first conductive layer and the third conductive layer is a copper foil.

Preferably, the base material layers comprise a first base material layer and a second base material layer directly attached to the conductive layer, and the first conductive layer and the third conductive layer are bonded to the first base material layer by hot pressing or an adhesive.

The first conductive layer and the third conductive layer are etched to form the conductive path thereon, and the second conductive layer is bonded to the first base material layer, the first conductive layer and the third conductive layer by coating or printing.

The second base material layer is bonded to the first base material layer, the first conductive layer, the second conductive layer, and the third conductive layer by hot pressing or an adhesive.

Preferably, the base material layer comprises a first base material layer and a second base material layer directly attached to the conductive layer, and the first base material layer is a thermoplastic elastomer layer.

The first conductive layer and the third conductive layer are bonded to the first base material layer by hot pressing.

The first conductive layer and the third conductive layer are etched to form the conductive path thereon, and the second conductive layer is bonded to the first base material layer, the first conductive layer and the third conductive layer by coating or printing.

Preferably, the first base material layer and the second base material layer are formed of any one of PEEK, PAR, PEI, PI, PPS, PEN, PET, TPEE and TPU.

Preferably, the base material layers further comprise a third base material layer, and the third base material layer is attached to a surface of the first base material layer and/or the second base material layer away from the conductive layer.

Preferably, the third base material layer is formed of plastic, thermoplastic elastomer or rubber.

Preferably, the third base material layer is formed of any one of PEEK, PAR, PEI, PI, PPS, PEN, PET, TPEE and TPU.

Preferably, an adhesive layer is provided between the third base material layer and the first base material layer and/or the second base material layer.

Preferably, the first conductive layer is provided with an inner pad thereon, the third conductive layer is provided with an outer pad thereon, and the inner pad is provided to be connected to the voice coil, and the outer pad is provided to be connected to an external circuit.

Each of the inner pad and the outer pad is exposed from the base material layers.

Preferably, each of the first conductive layer, the second conductive layer and the third conductive layer comprises at least two parts separated from each other, and the first conductive layer, the second conductive layer and the third conductive layer form at least two separated conductive paths.

According to a second aspect of the present disclosure, there is provided a sound generation device, comprising a vibration system and a magnetic circuit system matched with the vibration system.

The vibration system comprises a sound generation diaphragm and a voice coil provided at a side of the sound generation diaphragm, and the sound generation diaphragm is made of the conductive film described above.

According to a third aspect of the present disclosure, there is provided a sound generation device, comprising a vibration system and a magnetic circuit system matched with the vibration system.

The vibration system comprises a sound generation diaphragm, a voice coil provided at a side of the sound generation diaphragm and a supporting diaphragm for elastically supporting the voice coil, and the supporting diaphragm is made of the conductive film described above.

In the conductive film provided by the embodiment of the present disclosure, the conductive layers are provided inside the base material layers, the first conductive layer at the inner side portion and the third conductive layer at the outer side portion are made of metal sheets, and the second conductive layer provided on the deformation portion is made of a material having Young's modulus smaller than Young's modulus of a material of the metal sheet described above. In the above structural arrangement, the conductive film is connected to a voice coil, and the lead wires of the voice coil can extend a shorter length to be connected to the first conductive layer, and then is connected to an external circuit by the third conductive layer electrically connected to thereof, and the lead wires of the voice coil does not required to be arranged in a suspended structure, thereby the risk of wire disconnection can be avoided, and a vibration system of the sound generation device can have a large amplitude and high sensitivity, so that the low-frequency performance is improved.

In addition, the conductive film of the present disclosure overcome problems of difficult for realization and low reliability of the conductive film in the prior art, and can realize mass production. Specifically, the first conductive layer and the third conductive layer are made of metal sheets having higher Young's modulus, to improve structural strengths of the inner side portion and the outer side portion, so that the two portions are not easily deformed, and the first conductive layer is used as a carrier for welding to the lead wires of the voice coil, the third conductive layer is used as a carrier for welding to the external circuit, so that the metal sheets can withstand high temperature during welding without burning the base material layers of the conductive film. Further, the second conductive layer is made of a material having smaller Young's modulus such as conductive adhesive, etc., so that the second conductive layer can adapt to repeated bending and deforming without breaking, to avoid the breaking of the conductive layers caused by frequent deformation of a deformation portion during reciprocating vibration of the conductive film.

Through the following detailed description of the exemplary embodiments of the present disclosure with reference to the accompanying drawings, other features and advantages of the present disclosure will become clear.

BRIEF DESCRIPTION OF THE DRAWINGS

The accompanying drawings incorporated into and constituting a part of the specification show embodiments of the present disclosure and are used to explain the principle of the present disclosure together with its description.

DESCRIPTION OF REFERENCE NUMERALS

Figure 1:
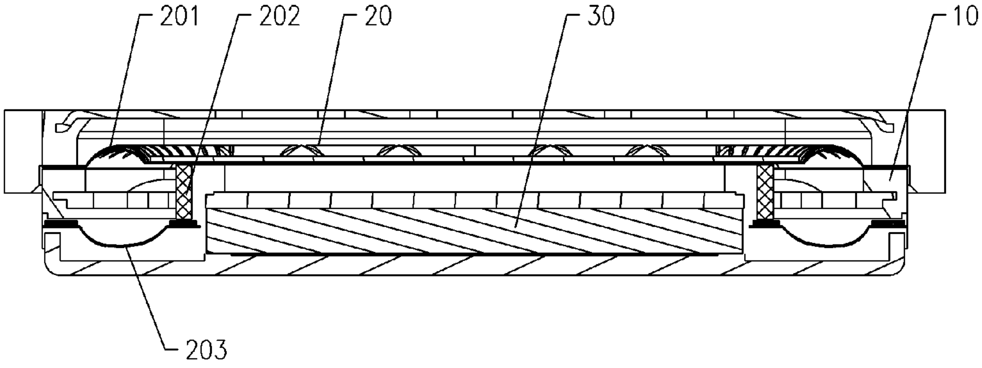
FIG. 1 is a schematic diagram of a structure of a sound generation device in an embodiment of the present disclosure.
Figure 2:
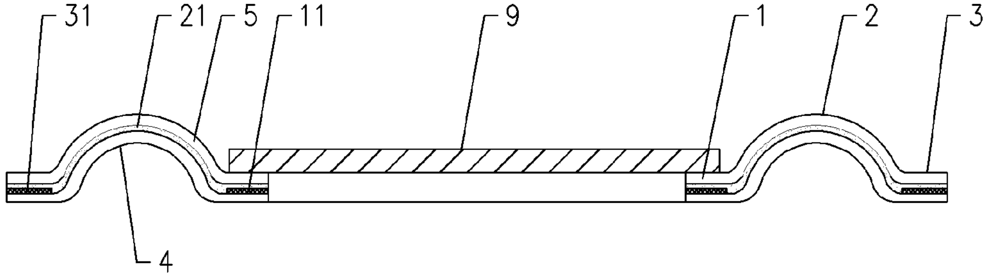
FIG. 2 is a schematic diagram of a structure of a conductive film in an embodiment of the present disclosure.
Figure 3:
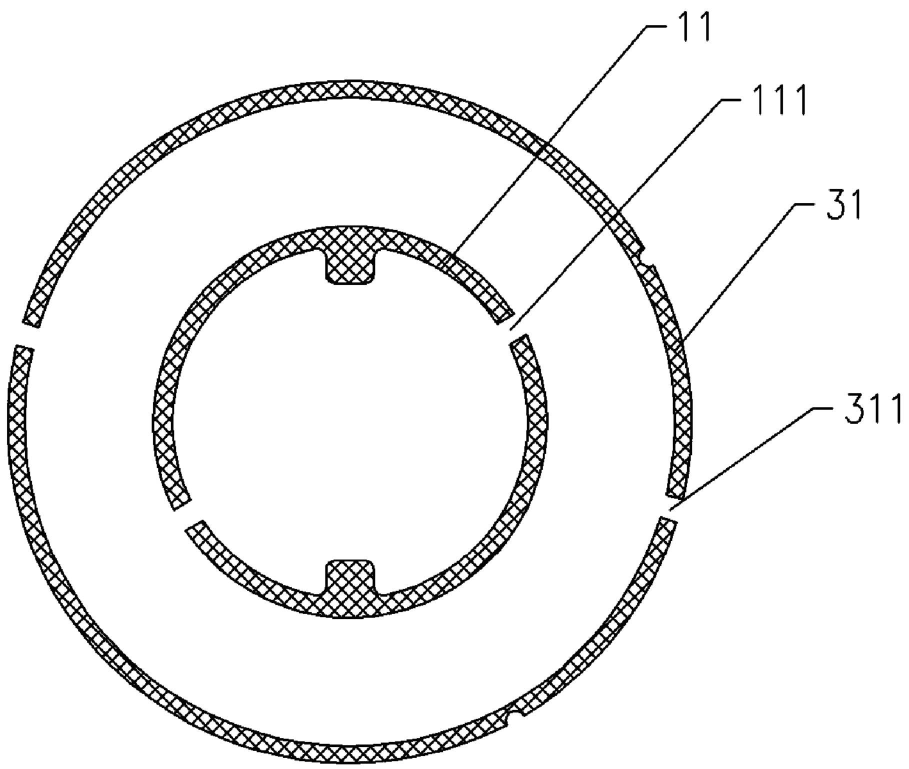
FIG. 3 is a schematic plan expanded view of a first conductive layer and a third conductive layer in the conductive film in an embodiment of the present disclosure.
Figure 4:
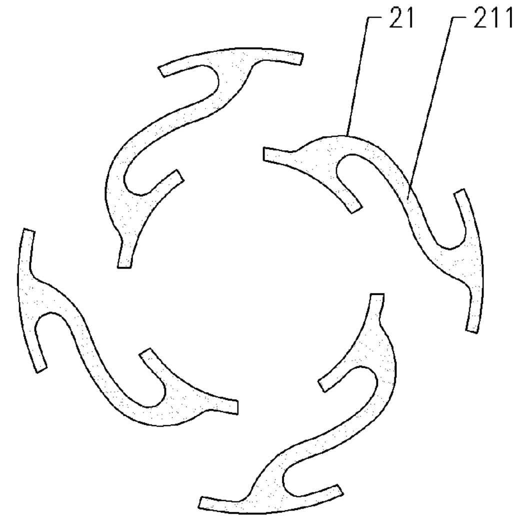
FIG. 4 is a schematic plan expanded view of a second conductive layer in the conductive film according to an embodiment of the present disclosure.
Figure 5:
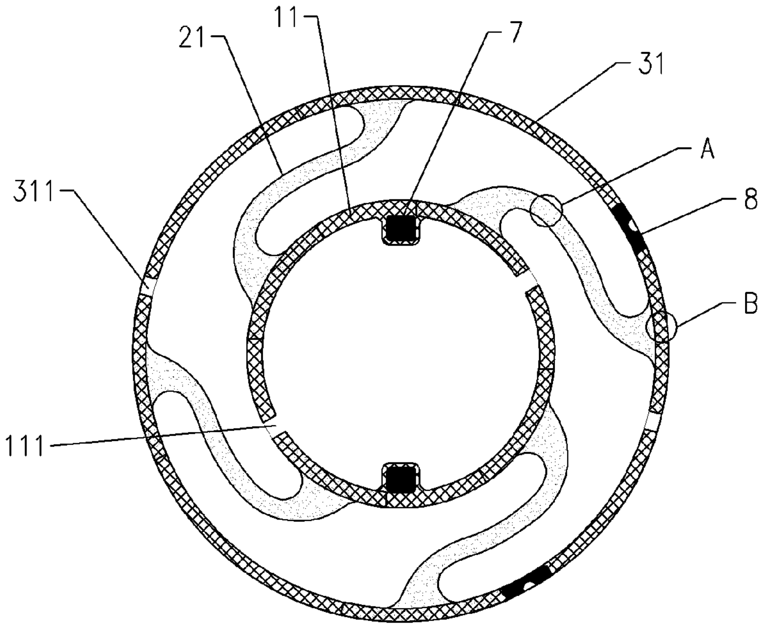
FIG. 5 is a schematic plan expanded view of the conductive layers in the conductive film in an embodiment of the present disclosure.
Figure 6:
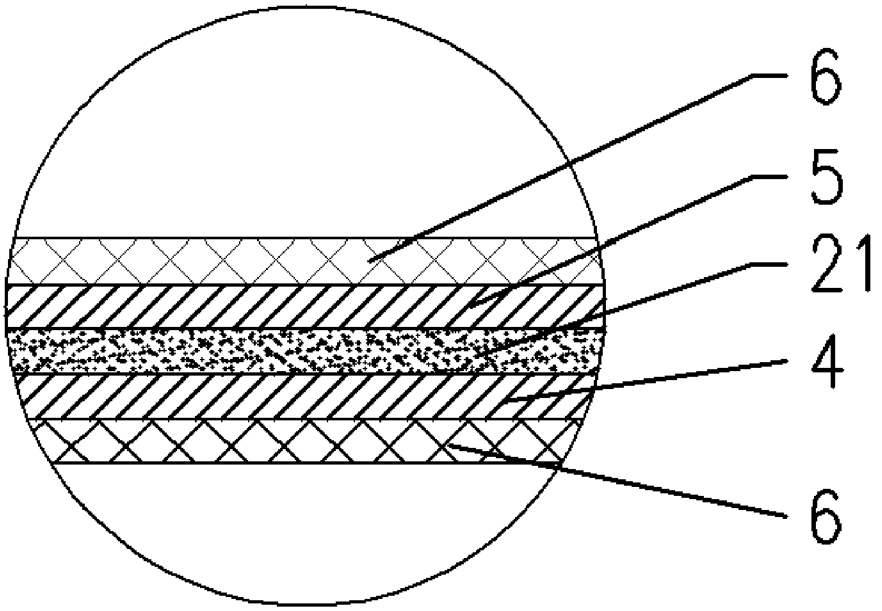
FIG. 6 is a cross-sectional view of part A in FIG. 5.
Figure 7:
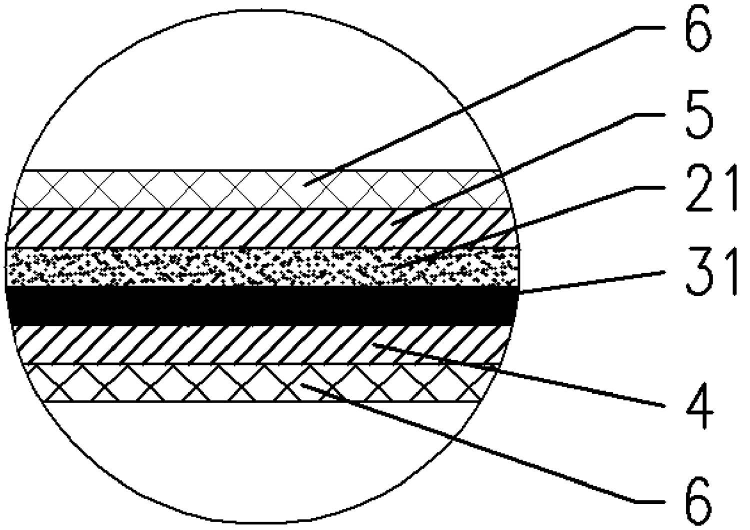
FIG. 7 is a cross-sectional view of part B in FIG. 5.

10: housing; 20: vibration system; 201: sound generation diaphragm; 202: voice coil; 203: supporting diaphragm; 30: magnetic circuit system; 1: inner side portion; 11: first conductive layer; 111: first partition portion; 2: deformation portion; 21: second conductive layer; 211: electrical connecting arm; 3: outer side portion; 31: third conductive layer; 311: second partition portion; 4: first base material layer; 5: second base material layer; 6: third base material layer; 7: inner pad; 8: outer pad; 9: reinforcing portion.

DETAILED DESCRIPTION OF EMBODIMENTS

Various exemplary embodiments of the present disclosure will now be described in detail with reference to the accompanying drawings. It should be noted that the relative arrangement, numerical expressions and values of the parts and steps described in these embodiments do not limit the scope of the present disclosure unless otherwise specified.

The following description of at least one exemplary embodiment is actually only illustrative and in no way serves as any limitation on the present disclosure and its application or use.

The technologies, methods and devices known to those skilled in the art may not be discussed in detail, but in appropriate circumstance, the technologies, methods and devices shall be regarded as a part of the specification.

In all of the examples shown and discussed here, any specific value should be interpreted as merely exemplary and not as a limitation. Therefore, other examples of exemplary embodiments may have different values.

It should be noted that similar reference numerals represent similar items in the following drawings. Therefore, once an item is defined in a drawing, it does not need to be further discussed in subsequent drawings.

As illustrated in FIGS. 1-7, a sound generation device applied to an electronic apparatus such as a headphone and a mobile phone and the like that can generate sound generally includes a housing 10, a vibration system 20 and a magnetic circuit system 30 mounted on the housing 10. Wherein, the vibration system 20 comprises a sound generation diaphragm 201 and a voice coil 202 bonded with the sound generation diaphragm 201, and the magnetic circuit system 30 comprises a magnetic conductive yoke and a central magnetic circuit portion and a side magnetic circuit portion provided on a bottom wall of the magnetic conductive yoke, a magnetic gap is formed between the central magnetic circuit portion and the side magnetic circuit portion, and the voice coil 202 extends into the magnetic gap. After a current is applied to the voice coil 202, the voice coil 202 is subjected to a force to vibrate under an action of a magnetic field of the magnetic circuit system 30, which correspondingly drives the sound generation diaphragm 201 to vibrate and generate sound.

In some cases, in order to prevent the vibration system 20 from being polarized, an elastic support structure such as a supporting diaphragm 203 is further provided in the vibration system 20, and the supporting diaphragm 203 can be provided between any end or an outer side surface of the voice coil 202 and the housing 10. Under an action of the supporting diaphragm 203, the vibration system 20 can have larger amplitude, to improve a low frequency performance of the product.

An embodiment of the present disclosure provides a conductive film used in the above-described sound generation device, and the conductive film can be used for the sound generation diaphragm 201 and also can be used for the supporting diaphragm 203.

As illustrated in FIGS. 2-7, the conductive film comprises a conductive layer and base material layers provided at two sides of the conductive layer, and the base material layers on two sides surround the conductive layer, to prevent the conductive layer from contacting other components to cause a short circuit phenomenon.

Further, the conductive film comprises an inner side portion 1 at an inner side thereof, a curve-shaped deformation portion 2 outside the inner side portion 1 and an outer side portion 3 outside the deformation portion 2. Wherein, the voice coil 202 is connected to the inner side portion 1, and the outer side portion 3 is generally connected to a fixed component such as the housing 10 and the like.

The conductive layer comprises a first conductive layer 11 provided on the inner side portion 1, a second conductive layer 21 provided on the deformation portion 2 and a third conductive layer 31 provided on the outer side portion 3, the two ends of the second conductive layer 21 are electrically connected to the first conductive layer 11 and the third conductive layer 31 respectively, and the first conductive layer 11, the second conductive layer 21 and the third conductive layer 31 are connected to form at least one conductive path.

In particular, the conductive layers in the embodiment of the present disclosure are made of different materials, each of the first conductive layer 11 and the third conductive layer 31 is made of a metal sheet, and Young's modulus of the second conductive layer 21 is less than Young's modulus of the metal sheet.

Wherein, the first conductive layer 11 is provided with an inner pad 7 thereon, the third conductive layer 31 is provided with an outer pad 8 thereon, and the inner pad 7 is provided to be connected to the voice coil 202, the outer pad 8 is provided to be connected to an external circuit. Each of the inner pad 7 and the outer pad 8 is exposed from the base material layers for electrical connection.

In the above arrangement, on the one hand, the conductive film is connected to the voice coil 202, and the lead wires of the voice coil 202 can extend a shorter length to be connected to the first conductive layer 11, and then is connected to the external circuit by the third conductive layer 31 electrically connected to thereof, and the lead wires of the voice coil 202 does not required to be arranged in a suspended structure, thereby the risk of wire disconnection can be avoided, and the vibration system 20 of the sound generation device can have a large amplitude and high sensitivity, so that the low-frequency performance is improved.

In addition, the conductive film of the present disclosure overcomes problems of difficult to realize and low reliability of the conductive film in the prior art, and can realize mass production. Specifically, the first conductive layer 11 and the third conductive layer 31 are made of metal sheets having higher Young's modulus, to improve structural strengths of the inner side portion 1 and the outer side portion 3, so that the two portions are not easily deformed, and the first conductive layer 11 is used as a carrier for welding to the lead wires of the voice coil 202, the third conductive layer 31 is used as a carrier for welding to the external circuit, so that the metal sheets can withstand high temperature during welding without burning the base material layers of the conductive film; Further, the second conductive layer 21 is made of a material having smaller Young's modulus such as conductive adhesive, etc., so that the second conductive layer 21 can adapt to repeated bending and deforming without breaking, to avoid the breaking of the conductive layer caused by frequent deformation of the deformation portion 2 during reciprocating vibration of the conductive film.

The above description provides an embodiment in which the conductive film and the voice coil 202 are electrically connected, but those skilled in the art should understand that the conductive film in the present disclosure can also be used in other circumstances, and they should be fall within the protection scope of the present disclosure, as long as the structure of the conductive layers defined in the above is further included on the basis of the structure and function of the conductive film itself. For example, in another embodiment, in the case where a metal layer is additionally provided as one movable polar plate of the capacitor on the conductive film, the conductive layers of the conductive film can be used to electrical connected to the movable polar plate.

The first conductive layer 11 and the third conductive layer 31 of the present disclosure are made of metal sheets. The thickness of the metal sheets can be controlled to 5 μm to 36 μm. For example, the first conductive layer 11 and the third conductive layer 31 are both copper foils. Copper foil has a thin sheet-shaped structure and has low surface oxidation property, and thereby can be easily attached to a surface of a base material with a variety of different materials. In addition, the conductivity of the copper material is excellent, so that the conductive film formed thereby can have good conductivity. The first conductive layer 11 and the third conductive layer 31 can be formed as predetermined circuit patterns by etching, corrosion, etc. which are well-known to those skilled in the art.

In an example of the present disclosure, the first conductive layer 11 and the third conductive layer 31 are made of rolled copper foils, for example, are made of RA copper foils or HA copper foils. The rolled copper foil has excellent tensile strength and large elongation, and has good ductility when bonded to the base material layers of the conductive film. In addition, it should be noted that the first conductive layer 11 and the third conductive layer 31 are not limited to be made of the same type of materials, and can be made of metal sheets of different materials according to specific requirements.

Further, two ends of the second conductive layer 21 extend to be disposed on the first conductive layer 11 and the third conductive layer 31 respectively, and the two ends of the second conductive layer 21 may partially or fully cover the first conductive layer 11 and the third conductive layer 31, to ensure the reliability of the connection between the second conductive layer and the first conductive layer, and the connection between the second conductive layer and the third conductive layer, so as to achieve the effect of a good conductive connection. During the vibration process of the conductive film, no separation occurs at the connection between the second conductive layer and the first conductive layer or the connection between the second conductive layer and the third conductive layer.

Specifically, the second conductive layer 21 is a conductive layer formed by coating or printing. The second conductive layer 21 is a conductive adhesive layer or a conductive ink layer, and the second conductive layer 21 formed by the conductive adhesive layer or the conductive ink layer has a smaller Young's modulus and good flexibility and fatigue resistance. As the second conductive layer 21 has stronger ability to resist destruction, the second conductive layer 21 is less likely to be fractured when the vibration system 20 vibrates in a large amplitude state.

As a specific embodiment, the second conductive layer 21 is a coated or printed conductive adhesive layer, the conductive adhesive is mainly composed of conductive particles, binders, solvents, auxiliaries, etc., and the conductive adhesive with high temperature is also doped with glass powder. Among them, the adhesives generally use epoxy type, acrylic type, polyurethane type and silicone type adhesives. After curing, the adhesive forms the molecular skeleton structure of the conductive adhesive layer, which provides the guarantee of mechanical performance and bonding performance, and causes the conductive particles to form channel. The solvent is one of butyl soluble anhydride acetate, diethylene glycol butyl ether acetate, diethylene glycol ethyl ether acetate and isophorone. Due to the high contents of the added conductive particles, the viscosity of the adhesive of the conductive adhesive is greatly increased, which often affects the process performance of the adhesive. In order to reduce the viscosity and achieve good processability and rheological property, it is also required to add a solvent or reactive diluent into the conductive adhesive.

Wherein, the conductive particles may be at least one of powders or alloy powders of gold, silver, copper, aluminum, zinc, and nickel. In this specific embodiment, the conductive adhesive layer is conductive silver adhesive, and the conductive particles in the conductive adhesive layer are silver particles. Silver is relatively cheap, has low resistance, good conductivity and is not easily oxidized.

In a specific embodiment, particle sizes of the silver particles are less than or equal to 1 μm. In a case where a filling ratio of the silver particles is constant and a thickness of the conductive adhesive layer is the same, the number of silver particles is more, the gap between the silver particles is smaller, and the electrical conductivity is increased. Further, the particle size of the silver particles is less than or equal to 100 nm, the nano-sized silver particles can further increase the conductivity of the second conductive layer 21, and the printing methods of the conductive silver adhesive are various and flexible, and the nano-imprinting process can be used to improve the printing accuracy, and its tolerance can be improved from the micron level of screen printing to the nanometer level.

Specifically, the conductive adhesive layer has a thickness of 6 μm to 15 μm, such that it has high reliability and low resistance when bonded to the base material layer. If the conductive adhesive layer has a thickness exceeding 15 μm, the conductive adhesive layer is easy to be fractured and peeled off after curing, and if the conductive adhesive layer has a thickness of less than 6 μm, the resistance of the conductive adhesive layer will be relatively high, the electrical conductivity will be affected in the two cases.

Specifically, the conductive adhesive layer has a sheet resistance of 10-30 $m\Omega/mm^2/mil$ after curing. If the sheet resistance is too small, it is difficult to manufacture. If the sheet resistance is too large, it needs to increase the thickness or the width to compensate for it. In the case where the sheet resistance has been determined and the thickness has been determined, the impedance of the finished product may be reduced by increasing the width, but the width will not be increased indefinitely in actual use, therefore it is better that the sheet resistance is as smaller as possible. When the sheet resistance of the conductive adhesive layer is less than 30 $m\Omega/mm^2/mil$, it can ensure the second conductive layer 21 to have lower impedance.

The conductive adhesive layer has a hardness of less than or equal to 3H after curing. The conductive film formed by the combination of the conductive adhesive layer and the base material layers has good compliance, good resilience and ductility, such that the sound generation device has good transient response and low THD distortion. If the conductive adhesive layer has a hardness of greater than 3H after curing, the conductive adhesive layer will affect the compliance of the vibration system 20 and thereby the THD distortion of the product is increased.

In a specific embodiment, each of the first conductive layer 11, the second conductive layer 21 and the third conductive layer 31 comprises at least two portions separated from each other, and the first conductive layer 11, and the first conductive layer 11, the second conductive layer 21 and the third conductive layer 31 form at least two separated conductive paths.

In this specific embodiment, the first conductive layer 11 comprises two portions that are separated from each other, and the third conductive layer 31 also comprises two portions that are separated from each other. The second conductive layer 21 comprises two portions provided between the two portions the first conductive layers 11 and the two portions of the third conductive layers 31 respectively, and each portion of the second conductive layers 21 may comprise two or more electrical connection arms 211. The first conductive layer 11 is provided with an inner pad 7 electrically connected to the first conductive layer 11 thereon, and the third conductive layer 31 is provided with an outer pad 8 electrically connected to the third conductive layer 31.

The inner pad 7 on the conductive film is electrically connected to the voice coil 202, and the outer pad 8 on the conductive film is electrically connected to the external circuit. Wherein, the outer pad 8 may be directly electrically connected to the external circuit, or may be electrically connected to the external circuit through an elastic sheet provided on the housing 10 of the sound generation device.

Those skilled in the art can make flexibly adjustment according to actual requirements, which is not limited thereto.

Further, the base material layers comprises a first base material layer 4 and a second base material layer 5 directly attached to the conductive layer, and the first conductive layer 11 and the third conductive layer 31 are bonded to the first base material layer 4 by hot pressing or an adhesive. After the first conductive layer 11 and the third conductive layer 31 are etched to form the conductive path thereon, the second conductive layer 21 is bonded to the first base material layer 4, the first conductive layer 11 and the third conductive layer 31 by coating or printing, and the second base material layer 5 is bonded to the first base material layer 4, the first conductive layer 11, the second conductive layer 21 and the third conductive layer 31 by hot pressing or an adhesive.

Wherein, the materials of the first base material layer 4 and the second base material layer 5 can be the same or different, and can be selected from plastics, thermoplastic elastomers and silicone commonly used in diaphragms, for example, the plastics may be PEEK, PAR, PEI, PI, PPS, PEN, PET, etc., for example, the thermoplastic elastomers may be TPEE, TPU, etc.

Those skilled in the art can flexibly adjust the thicknesses of the first base material layer 4 and the second base material layer 5 as required. In an example of the present disclosure, the thicknesses of the first base material layer 4 and the second base material layer 5 can be controlled to 3-50 μm, respectively, and the first base material layer 4 and the second base material layer 5 may provide a good protective on the conductive layer provided therebetween. By reasonably adjusting the thicknesses of the base material layers on both sides and the conductive layer, it can ensure that the conductive film has appropriate rigidity and flexibility as a whole, which can make the conductive film more stable when vibrates.

As a specific embodiment, the base material layers comprises a first base material layer 4 and a second base material layer 5 directly attached to the conductive layers, and the first base material layer 4 is a thermoplastic elastomer layer, the first conductive layer 11 and the third conductive layer 31 are bonded to the first base material layer 4 by hot pressing. After the first conductive layer 11 and the third conductive layer 31 are etched to form conductive paths, the second conductive layer 21 is bonded to the first base material layer 4, the first conductive layer 11 and the third conductive layer 31 by coating or printing.

As a preferred solution, the material of the first base material layer 4 is a thermoplastic polyurethane elastomer TPU material or a thermoplastic polyester elastomer TPEE material. Among them, the thermoplastic polyurethane elastomer TPU or the thermoplastic polyester elastomer TPEE belongs to thermoplastic elastomer TPE, and both have high adhesive force at high temperature. Therefore, when the first base material layer 4 is made of thermoplastic polyurethane elastomer TPU or thermoplastic polyester elastomer TPEE, the first base material layer 4 can be well bonded to the first conductive layer 11 and the third conductive layer 31 by hot pressing without using an adhesive. This configuration has characteristics of simple combination, good firmness and not easily separated.

It should be noted that, when the metal sheets of the first conductive layer 11 and the third conductive layer 31 are bonded to the first base material layer 4 by hot pressing, the temperature of the hot pressing is relatively high, usually around 110° C., at this time, since the material of the first base material layer 4 is thermoplastic elastomer TPE, the first base material layer 4 can form a viscous flow state, thereby has a strong adhesive force, and can be firmly bonded to the two conductive layers. After the two conductive layers are etched to form the conductive paths thereon, a rolling process is required to be applied on the two conductive layers and the first base material layer 4. This rolling processing is usually performed under a room temperature. Under the room temperature, the thermoplastic elastomer TPE has no adhesive force, and may not cause impurities such as dust to be adhered to the first base material layer 4 and the two conductive layers, so as to avoid influence on the subsequent molding processes.

Furthermore, the second base material layer 5 is also a thermoplastic elastomer layer, and the second base material layer 5 is bonded to the first base material layer 4, the first conductive layer 11, the second conductive layer 21, and the third conductive layer 31 by hot pressing.

The second base material layer 5 is also made of thermoplastic elastomer, and is bonded by hot pressing. There is no need to use an adhesive between the second base material layer 5 and the first base material layer 4, and the first base material layer 4 and the second base material layer 5 have no adhesive force under the room temperature. In the case where the alignment is not accurate between the second base material layer 5 and the first base material layer 4 before the second base material layer 5 and the first base material layer 4 are hot-pressed, the positions can be corrected once again without sticking, to ensure the accuracy for the alignment between the second base material layer 5 and the first base material layer 4. Further, the inner pad 7 on the first conductive layer 11 and the outer pad 8 on the second conductive layer 21 can be accurately exposed from reserved hollow positions of the base material layers, to ensure the reliability of the electrical connection.

It should be noted that, in the conductive film provided by the embodiment of the present disclosure, the materials of the first base material layer 4 and the second base material layer 5 may be the same or different, which may be flexibly adjusted by those skilled in the art according to actual requirements. For example, the first base material layer 4 is made of thermoplastic polyurethane elastomer TPU, and the second base material layer 5 is made of thermoplastic polyester elastomer TPEE. For another example, the first base material layer 4 and the second base material layer 5 are both made of thermoplastic polyurethane elastomer TPU, and the two base material layers are attached to the two surfaces of the conductive layer. For still another example, the two base material layers are both made of thermoplastic polyester elastomer TPEE, and the two base material layers are attached to the two surfaces of the conductive layer.

In addition, the base material layer may further comprise a third base material layer 6, and the third base material layer 6 is attached to a surface of the first base material layer 4 and/or the second base material layer 5 away from the conductive layer. The third base material layer 6 may be bonded only on the first base material layer 4, or the third base material layer 6 may be bonded only on the second base material layer 5, or alternatively, the third base material layer 6 may be bonded on both of the first base material layer 4 and the second base material layer 5. Those skilled in the art can make flexibly choices according to actual requirements, which is not limited thereto.

The material of the third base material layer 6 is plastic, thermoplastic elastomer or rubber. Specifically, the material of the third base material layer 6 is any one of PEEK, PAR, PEI, PI, PPS, PEN, PET, TPEE and TPU.

In the case where the first base material layer 4 and the second base material layer 5 are thermoplastic elastomers, the third base material layer 6 can be bonded with the first base material layer 4 or the second base material layer 5 by hot pressing. Since each of the first base material layer 4 and the second base material layer 5 is made of the thermoplastic elastomer, they have high adhesive force at high temperature and can be firmly bonded with the surface of the third base material layer 6, and does not required to use additional special adhesives, the bonding method is relatively simple and the bonding firmness is better. As a preferred embodiment, the third base material layer 6 may be bonded to the first base material layer 4 by hot pressing, and then a conductive layer is formed on the first base material layer 4. The third base material layer 6 may be bonded to the second base material layer 5 by hot pressing, and then bonded to the first base material layer 4 and the conductive layer by hot pressing. However, the present disclosure is not limited to the above-described forming steps.

As a different embodiment, an adhesive layer is provided between the third base material layer 6 and the first base material layer 4 and/or the second base material layer 6. Specifically, the third base material layer 6 may be bonded to the first base material layer 4 through an adhesive layer, and then a conductive layer is formed on the first base material layer 4. The third base material layer 6 may be bonded to the second base material layer 5 through an adhesive layer, and then bonded to the first base material layer 4 and the conductive layer by hot pressing. However, the present disclosure is not limited to the above-described forming steps.

With reference to FIGS. 1 to 7, the embodiment of the present disclosure provides a sound generation device. As described above, the sound generation device comprises the vibration system 20 and the magnetic circuit system 30 matched with the vibration system 20. The sound generation device further comprises the housing 10 having a receiving cavity, and both of the vibration system 20 and the magnetic circuit system 30 are accommodated in the receiving cavity. Wherein, the vibration system 20 comprises the sound generation diaphragm 201 and the voice coil 202 disposed at a side of the sound generation diaphragm 201. The sound generation diaphragm 201 is made of the conductive film described in the above embodiment. During the operation of the sound generation device, the voice coil 202 into which the electrical signal is applied interacts with the magnetic circuit system 30 to vibrate up and down, thereby driving the sound generation diaphragm 201 to generate sound.

The sound generation device may have a circular structure or a rectangular structure. This embodiment illustrates a sound generation device having a circular structure, and the corresponding sound generation diaphragm 201 has a circular structure.

As a specific embodiment, the first conductive layer 11 and the second conductive layer 21 are made of copper foils, the first conductive layer 11 is in a annular structure, and the first conductive layer 11 is provided at a position adjacent to the deformation portion 2 on an edge of the inner side portion 1 of the conductive film, and the first conductive layer 11 can be used to form an electrical connection to the voice coil 202. Specifically, the voice coil 202 usually has two lead wires of the voice coil 202. As for the first conductive layer 11, in order to form two separated conductive paths electrically connected to the two lead wires of the voice coil 202, this embodiment provides a first partition portion 111 at each of two opposite positions of the annular first conductive layer 11, and no conductive layer is provided at the positions where the first partition portions 111 are provided, such that the first conductive layer 11 is divided into two portions separated from each other. In addition, an inner pad 7 electrically connected to the first conductive layer 11 is provided inside the first conductive layer 11. Wherein, at least two inner pads 7 are provided, which can be used for electrical connection to the two lead wires of the voice coil 202.

Wherein, the inner pad 7 is provided corresponding to each of the conductive paths, and the lead wires of the voice coil 202 can be electrically connected to any one of the two inner pads 7 corresponding to the conductive paths. Certainly, t inner pads 7 may be provided in plural, such as four inner pads, six inner pads, etc., and those skilled in the art can made flexibly adjustment according to actual requirements, which is not limited.

Further, the third conductive layer 31 has an annular structure. The third conductive layer 31 is provided at an edge position of the conductive film, that is, the position of the outer side portion 3, and is used for connection to the external circuit. Similarly, in order to form two separated conductive paths, this embodiment provides a second partition portion 111 at each of two opposite positions of the annular second conductive layer 21, and no conductive layer is provided at the positions where the second partition portions 311 are provided, such that the third conductive layer 31 is constituted by two portions independent of each other.

In addition, outer pads 8 are respectively provided on the third conductive layer 31. The outer pads 8 are used for electrical connection to the electrical connectors on the housing 10 of the sound generation device by welding or the like. Wherein, the first base material layer 4 and the second base material layer 5 corresponding to an upper portion and an lower portion of the outer pads 8 are provided with escape regions for avoiding the outer pads 8, such that the outer pads 8 can be appropriately exposed from the base material layers to facilitate electrical connection to the external circuit.

In addition, a metal protective layer may also be provided on surfaces of the inner pads 7 and the outer pads 8. For example, the metal protective layer can be formed by electroplating, and of course, the metal protective layer may also be attached to the surfaces of the inner pads and the outer pads, which is not limited thereof.

The second conductive layer 21 in this embodiment is a curved strip-shaped structure manufactured by printing with conductive adhesive. The second conductive layer 21 in this embodiment comprises two portions, and each portion comprises two strip-shaped electrical connection arms 211, the four electrical connection arms 211 are disposed symmetrically with respect to a center, which can ensure symmetry of vibration of the sound generation diaphragm 201, so that the sound generation diaphragm is not easy to generate polarization.

In addition, when the conductive film of the present disclosure is used as the sound generation diaphragm 201, it may further comprise a rigid reinforcing portion 9, and the reinforcing portion 9 is bonded at the inner side portion 1 of the conductive film. When the rigid reinforcing part 9 is provided on the conductive film of the present disclosure, the reinforcing portion 9 and the conductive film can be bonded together by a manner well known by those skilled in the art (for example, an adhesive). The high-frequency characteristic of the conductive film can be effectively improved by adding the rigid reinforcing portion 9 on the conductive film. However, it should be noted that, as for the conductive film of the present disclosure, those skilled in the art can choose to provide or not to provide the reinforcing portion 9 on the conductive film according to actual requirements, which is not limited thereof.

Figure 8:
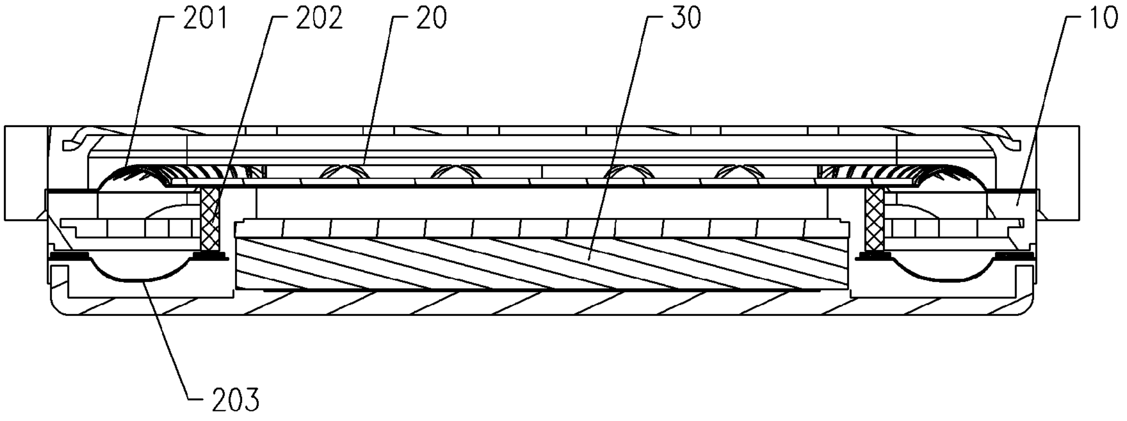
FIG. 8 is a schematic diagram of a structure of the sound generation device in another embodiment of the present disclosure.
Figure 9:
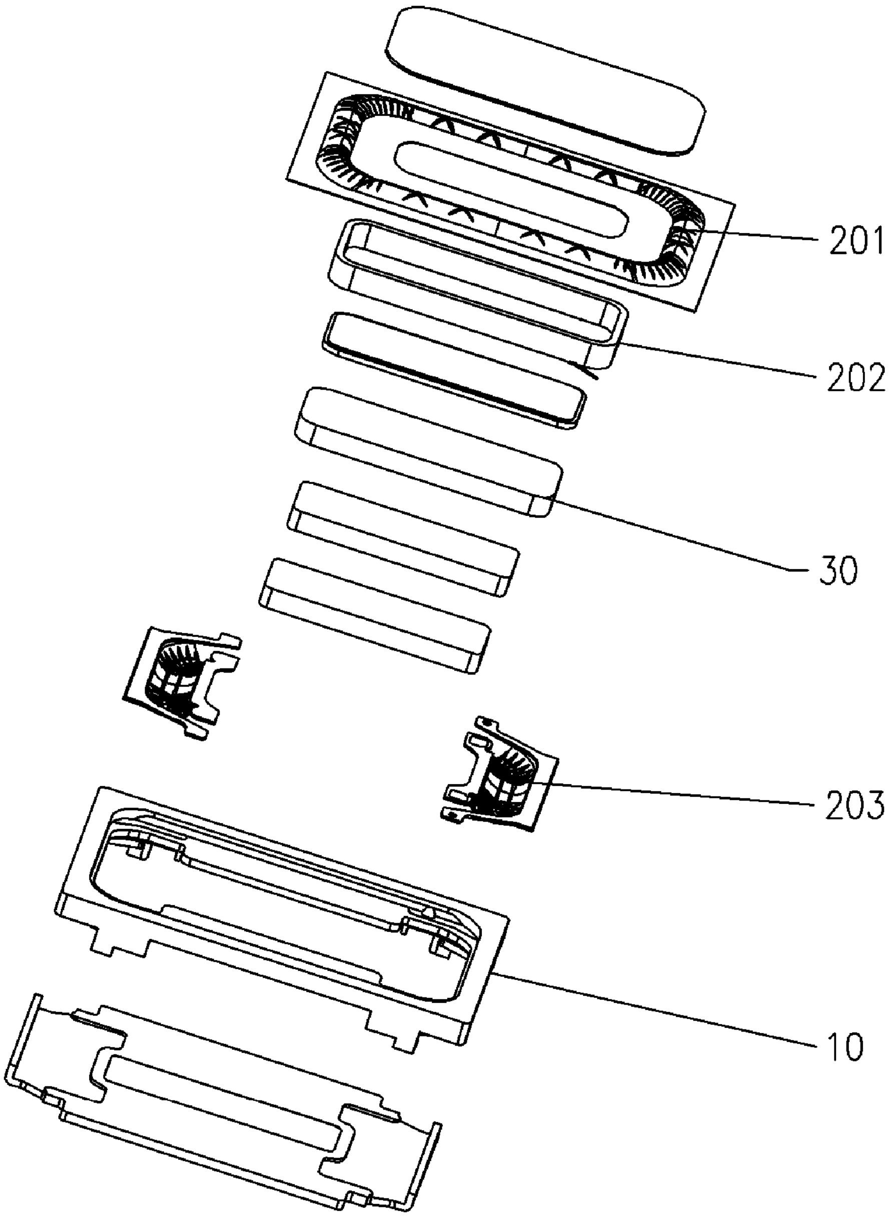
FIG. 9 is an exploded schematic view of the sound generation device in the embodiment of FIG. 8.
Figure 10:
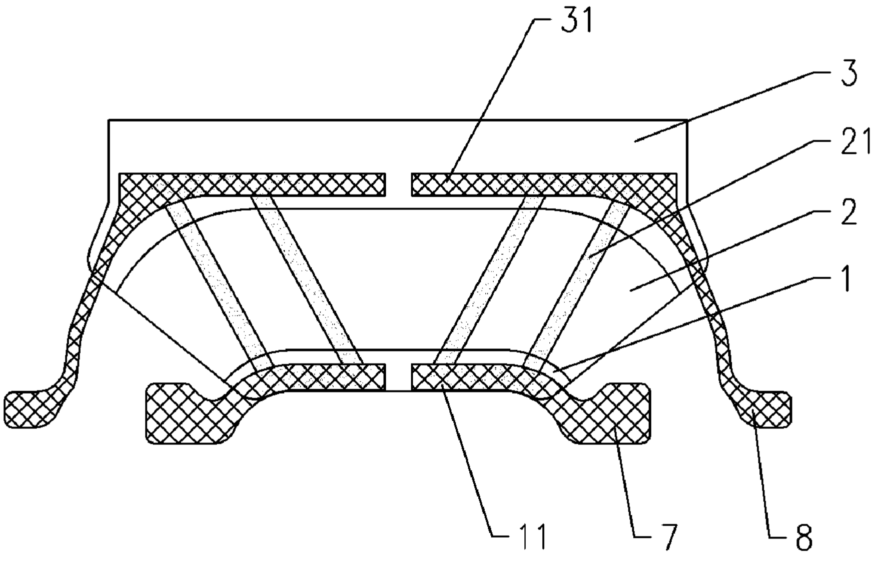
FIG. 10 is a schematic diagram of the structure of the conductive film in the embodiment of FIG. 8.

With reference to FIG. 8 to FIG. 10, another embodiment of the present disclosure further provides a sound generation device, which comprises a vibration system 20 and a magnetic circuit system 30 matched with the vibration system 20. The vibration system 20 comprises a sound generation diaphragm 201, a voice coil 202 disposed at a side of the sound generation diaphragm 201 and a supporting diaphragm 203 for elastically supporting the voice coil 202. Wherein, the sound generation diaphragm 203 is made of the conductive film described in the above embodiment.

The sound generation device may have a circular structure or a rectangular structure. This embodiment illustrates a sound generation device having a rectangular structure, and the corresponding sound generation diaphragm 201 and the voice coil 202 also have rectangular structures.

As a specific embodiment, the voice coil 202 comprises two oppositely arranged long sides and two oppositely arranged short sides, and each of the short sides of the voice coil 202 is provided with a supporting diaphragm 203. For example, at least one of the supporting diaphragms 203 is the conductive film of the present disclosure. When the conductive film of the present disclosure is used as the supporting diaphragm 203, it has advantages of stable vibration, capable of preventing the vibration system 20 inside from polarizing, capable of improving the loudness of the sound generation and reducing nonlinear distortion.

When the conductive film of the present disclosure is used as the supporting diaphragm 203, an outer side portion 3, an inner side portion 1 and a deformation portion 2 are distributed on the supporting diaphragm 203. Wherein, the outer side portion 3 is provided to be connected to the housing 10, and the inner side portion 1 is provided to be connected to the voice coil 202. The conductive layer comprises a first conductive layer 11 distributed on the inner side portion 1, a second conductive layer 21 distributed on the deformation portion 2 and a third conductive layer 31 distributed on the outer portion 3. In addition, the second conductive layer 21 connects the first conductive layer 11 and the third conductive layer 31, and the first conductive layer 11, the second conductive layer 21 and the third conductive layer 31 are connected to form two separated conductive paths separated from each other, and the first conductive layer 11 is provided with two inner pads 7 electrically connected to the two conductive paths correspondingly, and the third conductive layer 31 is provided with two outer pads 8 electrically connected to the two conductive paths correspondingly. Wherein, the inner pads 7 can be used for electrical connection to the voice coil 202, and the outer pads 8 can be used for electrical connection to an external circuit, so that the lead wires 202 of the voice coil do not need to extend too long to achieve the electrical connection between the voice coil 202 and the conductive films, and a phenomenon that the lead wires of the voice coil 202 is disconnected during operation can be effectively avoided, so that the stability of the product is improved.

On the other hand, the embodiment of the present disclosure further provides an electronic apparatus, which comprises the above-described sound generation device. Wherein, the electronic apparatus may be, but not limited to, a mobile phone, a tablet computer, a smart wearable apparatus, a smart watch, a walkie-talkie, a TV and a smart speaker, or the like. The electronic apparatus may comprise a housing and the sound generation device according to the embodiments of the present disclosure, and the sound generation device is accommodated and fixed in the housing.

Although some specific embodiments of the present disclosure have been described in detail by examples, those skilled in the art should understand that the above examples are only for illustration, not to limit the scope of the present disclosure. Those skilled in the art should understand that the above embodiments may be modified without departing from the scope and spirit of the present disclosure. The scope of the present disclosure is defined by the appended claims.

What is claimed is:

1. A conductive film for a sound generation device, wherein the conductive film comprises a conductive layer and base material layers provided at two sides of the conductive layer, wherein the conductive film comprises an inner side portion at an inner side of the conductive film, a curve-shaped deformation portion outside the inner side portion and an outer side portion outside the deformation portion, wherein the conductive layer comprises a first conductive layer provided on the inner side portion, a second conductive layer provided on the deformation portion and a third conductive layer provided on the outer side portion, two ends of the second conductive layer are respectively electrically connected to the first conductive layer and the third conductive layer, and the first conductive layer, the second conductive layer and the third conductive layer are connected to form at least one conductive path, and wherein each of the first conductive layer and the third conductive layer is made of a metal sheet, and Young's modulus of the second conductive layer is smaller than Young's modulus of the metal sheet.

2. The conductive film for a sound generation device of claim 1, wherein the two ends of the second conductive layer extend to be disposed on the first conductive layer and the third conductive layer, respectively.

3. The conductive film for a sound generation device of claim 1, wherein the second conductive layer is a conductive layer formed by coating or printing.

4. The conductive film for a sound generation device of claim 3, wherein the second conductive layer is a conductive adhesive layer.

5. The conductive film for a sound generation device of claim 4, wherein the conductive adhesive layer is a conductive silver adhesive.

6. The conductive film for a sound generation device of claim 3, wherein the second conductive layer is a conductive ink layer.

7. The conductive film for a sound generation device of claim 1, wherein each of the first conductive layer and the third conductive layer is a copper foil.

8. The conductive film for a sound generation device of claim 1, wherein the base material layers comprise a first base material layer and a second base material layer directly attached to the conductive layer, and the first conductive layer and the third conductive layer are bonded to the first base material layer by hot pressing or an adhesive, and wherein the first conductive layer and the third conductive layer are etched to form the conductive path thereon, and the second conductive layer is bonded to the first base material layer, the first conductive layer and the third conductive layer by coating or printing, and wherein the second base material layer is bonded to the first base material layer, the first conductive layer, the second conductive layer, and the third conductive layer by hot pressing or an adhesive.

9. The conductive film for a sound generation device of claim 8, wherein the first base material layer and the second base material layer are formed of any one of PEEK, PAR, PEI, PI, PPS, PEN, PET, TPEE and TPU.

10. The conductive film for a sound generation device of claim 8, wherein the base material layers further comprise a third base material layer, and the third base material layer is attached to a surface of the first base material layer and/or the second base material layer away from the conductive layer.

11. The conductive film for a sound generation device of claim 10, wherein the third base material layer is formed of plastic, thermoplastic elastomer or rubber.

12. The conductive film for a sound generation device of claim 11, wherein the third base material layer is formed of any one of PEEK, PAR, PEI, PI, PPS, PEN, PET, TPEE and TPU.

13. The conductive film for a sound generation device of claim 10, wherein an adhesive layer is provided between the third base material layer and the first base material layer and/or the second base material layer.

14. The conductive film for a sound generation device of claim 1, wherein the first conductive layer is provided with an inner pad thereon, the third conductive layer is provided with an outer pad thereon, and the inner pad is provided to be connected to a voice coil, and the outer pad is provided to be connected to an external circuit, and wherein each of the inner pad and the outer pad is exposed from the base material layers.

15. The conductive film for a sound generation device of claim 1, wherein each of the first conductive layer, the second conductive layer and the third conductive layer comprises at least two parts separated from each other, and the first conductive layer, the second conductive layer and the third conductive layer form at least two separated conductive paths.

16. A sound generation device, comprising a vibration system and a magnetic circuit system matched with the vibration system, wherein the vibration system comprises a sound generation diaphragm and a voice coil provided at a side of the sound generation diaphragm, and the sound generation diaphragm is made of the conductive film of claim 1.

17. A sound generation device, comprising a vibration system and a magnetic circuit system matched with the vibration system, wherein the vibration system comprises a sound generation diaphragm, a voice coil disposed at a side of the sound generation diaphragm and a supporting diaphragm for elastically supporting the voice coil, and the supporting diaphragm is made of the conductive film of claim 1.

* * * * *